(12) United States Patent
Boquet et al.

(10) Patent No.: US 7,448,789 B2
(45) Date of Patent: Nov. 11, 2008

(54) DEVICE FOR GUIDING A SHAFT IN AN OSCILLATING MOVEMENT

(75) Inventors: Jean Boquet, Le Perray en Yvelines (FR); Jean-Marc Moine, Sallanches (FR)

(73) Assignee: Bertin Technologies (FR)

( * ) Notice: Subject to any disclaimer, the term of this patent is extended or adjusted under 35 U.S.C. 154(b) by 20 days.

(21) Appl. No.: 11/613,541

(22) Filed: Dec. 20, 2006

(65) Prior Publication Data

US 2007/0154125 A1 Jul. 5, 2007

Related U.S. Application Data

(63) Continuation of application No. PCT/FR2005/001580, filed on Jun. 22, 2005.

(30) Foreign Application Priority Data

Jun. 23, 2004 (FR) .................................. 04 06850
Dec. 13, 2004 (FR) .................................. 04 13235

(51) Int. Cl.
*B01F 11/00* (2006.01)
*F16C 23/08* (2006.01)
(52) U.S. Cl. ........................ 366/110; 366/209; 384/496
(58) Field of Classification Search ................. 366/208, 366/209, 210, 211, 212, 213, 215; 384/558, 384/495, 496, 497, 498; 464/178
See application file for complete search history.

(56) References Cited

U.S. PATENT DOCUMENTS

| 1,205,539 | A | * | 11/1916 | Hirth ........................... 384/454 |
| 1,281,205 | A | * | 10/1918 | Pruyn .......................... 384/498 |
| 2,648,391 | A | | 8/1953 | Cushman et al. |
| 2,767,037 | A | | 10/1956 | Williams |
| 3,749,371 | A | | 7/1973 | Folkenroth et al. |
| 3,934,957 | A | | 1/1976 | Derner et al. |
| 3,985,307 | A | * | 10/1976 | Ebbert et al. ................. 241/284 |
| 4,125,335 | A | * | 11/1978 | Blume et al. ................. 366/209 |
| 4,424,718 | A | | 1/1984 | Wadensten et al. |
| 5,567,050 | A | * | 10/1996 | Zlobinsky et al. ........... 366/209 |
| 5,639,160 | A | * | 6/1997 | Kishimoto ................... 366/208 |
| 7,101,077 | B2 | * | 9/2006 | Esteve et al. ................. 366/110 |
| 2004/0202045 | A1 | | 10/2004 | Marazzi Umberto et al. |
| 2005/0128863 | A1 | * | 6/2005 | Esteve et al. ................. 366/110 |

FOREIGN PATENT DOCUMENTS

| FR | 874 119 A | 7/1942 |
| FR | 2 843 047 A | 2/2004 |
| FR | 2 851 480 A1 * | 8/2004 |

(Continued)

*Primary Examiner*—Tony G Soohoo
(74) *Attorney, Agent, or Firm*—Alston & Bird LLP

(57) ABSTRACT

A device for guiding a shaft in an oscillating movement about a center of rotation situated on the axis of the shaft comprises a ball-and-socket bearing and a ball bearing mounted one inside the other between the shaft and a fixed support. The ball-and-socket bearing comprises a ball-and-socket joint with an outer convex surface in a portion of a sphere forming the inner race of the bearing, and two rings of balls that are arranged between the ball-and-socket joint and two superposed outer races of the bearing and that are guided in semi-cylindrical annular slots or grooves of the races.

21 Claims, 3 Drawing Sheets

FOREIGN PATENT DOCUMENTS

| | | | |
|---|---|---|---|
| FR | 2851 480 | * | 8/2004 |
| FR | 2 872 233 A1 | * | 12/2005 |
| FR | 2 879 110 A1 | * | 6/2006 |
| JP | 60 188617 A | | 9/1985 |
| WO | WO 2004/012851 A2 | | 2/2004 |
| WO | WO 2006/008397 A1 | * | 1/2006 |

\* cited by examiner

DEVICE FOR GUIDING A SHAFT IN AN OSCILLATING MOVEMENT

CROSS-REFERENCE TO RELATED APPLICATIONS

This is a continuation of International Application PCT/FR05/01580 filed Jun. 22, 2005, which claims priority from French application No. 0406850 filed Jun. 23, 2004 and French application No. 0413235 filed Dec. 13, 2004.

FIELD AND BACKGROUND OF THE INVENTION

The invention relates to a device for guiding a shaft in an oscillating movement about a point situated on the axis of the shaft, this device applying in particular to the rapid vibration of tubes containing biological samples, for the grinding of these samples by means of small glass or ceramic beads that are contained in the tubes with the samples.

An apparatus is disclosed, particularly in document WO 2004/012851 of the applicant, that comprises a tube-holder plate mounted at one end of a shaft guided in an oscillating movement on a fixed support and driven via its other end that is mounted in an eccentric bearing supported by the output shaft of an electric motor.

The guidance device described in this prior document comprises a set of two concentric bearings, one of which is a ball-and-socket bearing and the other a ball bearing, the ball-and-socket bearing being mounted on the shaft and inside the ball bearing while the ball bearing is mounted between the ball-and-socket bearing and the fixed support.

This known guidance device is very effective: the speed of rotation of the electric motor output shaft may lie between approximately 6500 and 8000 revolutions per minute at normal speed (the samples in the tubes then being subjected to accelerations of approximately 600 to 800 g) and its service life is more than several thousands of operating cycles of 45 seconds every two minutes.

In this known device, the ball-and-socket bearing comprises an inner cylindrical race sleeve-fitted onto the shaft supporting the plate and two rings of balls arranged between this race and an outer race with an internal spherical surface in contact with the balls, that are guided and retained in two semicylindrical grooves in the outer surface of the inner race.

A disadvantage of this known device is the limited possible angular range of movement of the shaft and the plate, that is equal, in the ball-and-socket bearings available on the market, to approximately 4 degrees on either side of a mid-position, which limits the travel of the tubes carried by the plate. To increase this travel and hence the acceleration to which the samples contained in the tubes are subjected, it is necessary to increase the distance between the tubes and the axis of the shaft, which increases the effective diameter of the plate and hence its weight and the energy needed to drive it in an oscillating movement.

The object of the present invention is to enhance this known guidance device, in order in particular to increase the allowed angular range of movement of the shaft on either side of a mid-position or to reduce the diameter of the plate.

SUMMARY OF THE INVENTION

For this reason, the invention proposes a device for guiding a shaft in an oscillating movement about a center of rotation situated on the axis of the shaft, this device comprising a ball-and-socket bearing and a ball bearing mounted one inside the other between the shaft and a fixed support and being characterized in that the ball-and-socket bearing comprises a ball-and-socket joint with an outer convex surface in a portion of a sphere forming the inner race of the bearing and two rings of balls that are arranged between the ball-and-socket joint and two superposed outer races of the bearing and that are guided in semicylindrical annular slots or grooves of the races.

This arrangement of the ball-and-socket joint between two superposed rings of balls makes it possible to increase the allowed angular range of movement of the ball-and-socket joint on either side of a mid-position while preventing the application of a rotary torque to a plate supported by the shaft when the latter is driven in an oscillating movement about the center of rotation.

The balls of each ring of balls of the ball-and-socket bearing are housed in circular orifices of a cylindrical cage mounted between the ball-and-socket joint and an outer cylindrical race of the ball-and-socket bearing.

In a preferred embodiment of the invention, the ball-and-socket joint is fixedly mounted on the shaft and two superposed ball bearings are mounted between the fixed support and the superposed outer races of the ball-and-socket bearing.

In this case, advantageously, the outer races of the ball-and-socket bearing are formed by the inner races of the ball bearings surrounding the ball-and-socket bearing.

According to another feature of the invention, the two superposed outer races of the ball-and-socket bearing and the two superposed ball bearings are substantially axially adjacent and separated by a shim made of elastically deformable material, such as rubber or similar material.

The device according to the invention advantageously comprises means for adjusting the axial distance between the two antifriction bearings, these adjustment means comprising for example a nut screwed onto the fixed support and pressing on one of the antifriction bearings, while the other antifriction bearing is pressing on the fixed support.

This arrangement makes it possible to precisely adjust the operating clearance of the ball-and-socket joint.

When this adjustment has been made, the nut screwed onto the fixed support is prevented from rotating by appropriate means.

In another embodiment of the invention, the arrangement described hereinabove is inverted and the ball-and-socket bearing is around a ball bearing supported by the shaft, and is between the fixed support and the ball bearing.

In this case, the ball-and-socket joint of the ball-and-socket bearing is fixedly attached in rotation to the outer race of the ball bearing whose inner race is mounted fixedly in rotation on the shaft. The two outer races of the ball-and-socket bearing are fixedly mounted on the fixed support.

These two outer races are axially separated by a rubber or similar shim, and their distance, determining the operating clearance of the ball-and-socket joint, is adjusted by the same means as those of the first embodiment, these means comprising an annular part screwed onto the fixed support and pressing on one of the two outer races, the other outer race pressing on the fixed support.

In this variant embodiment, the dimensions of the ball-and-socket joint are greater than in the first embodiment, but the operating principle remains the same.

The invention applies in particular, but not exclusively, to a device for the rapid vibration of tubes containing biological samples, this device comprising a tube-holder plate that is mounted on one end of the aforementioned shaft whose other end is connected to drive means and is mounted in an eccentric bearing supported by the output shaft of a motor.

Preferably, this eccentric bearing is supported by a disk that is mounted in an antifriction bearing case supported by the fixed support, this disk being connected to the output shaft of the motor via an elastic coupling.

For this device to be quiet, so as not to cause annoyance and fatigue, for example when it is used in a laboratory where there are people doing work requiring a degree of concentration, means for damping noise and vibrations are mounted between the fixed support and the means for guiding and driving the aforementioned shaft.

In a preferred embodiment of the invention, these means for damping noise and vibrations comprise elastomer rings having a Shore A hardness lying between 55 and 85, and preferably approximately 70.

It has been noted that the mounting of these elastomer rings between the fixed support and the means for guiding and driving the shaft made it possible to reduce the noise and vibration level in operation by approximately 5 to 10 dB, so that the device is now very quiet in operation and no longer causes annoyance or fatigue that would impair the concentration of the people working in its immediate vicinity.

In this preferred embodiment, an eccentric that connects one end of the shaft to its drive means is guided in rotation in an antifriction bearing supported by a plate that is itself mounted by means of an aforesaid elastomer ring in a cylindrical housing of the fixed support.

The means for guiding the shaft of the plate comprising the ball-and-socket bearing and the ball bearings are mounted inside a metal socket itself attached to a bore of a fixed part by an aforementioned elastomer ring.

Another elastomer ring is mounted between this fixed part and the fixed support of the apparatus.

According to yet another feature of the invention, the aforementioned noise and vibration damping means also comprise means for elastically suspending an upper portion of the device, comprising at least the means for centering and guiding the shaft on a lower portion of the device, comprising the fixed support and the means for driving the shaft.

These elastic suspension means are advantageously of the type with elastomer stops or blocks or with cables and make it possible to filter the low frequency and medium frequency vibrations on startup and shutdown of the motor for driving the shaft, while the aforementioned elastomer rings effectively filter the higher frequencies generated in continuous operation.

Generally, these elastomer rings and these suspension means make it possible to considerably reduce the level of noise generated by the apparatus in operation, without impairing the accuracy of the centering and guidance of the shaft of the plate and without reducing the service life of the centering and guidance means.

Damping means of the "silent block" type are also provided between the device and its feet resting on a support, to damp the very low frequency vibrations that may occur on startup and shutdown of the motor.

BRIEF DESCRIPTION OF THE DRAWINGS

The invention will be better understood and other features, details and advantages of the latter will appear more clearly on reading the following description, given as an example with reference to the appended drawings in which.

DETAILED DESCRIPTION

Figure 1:
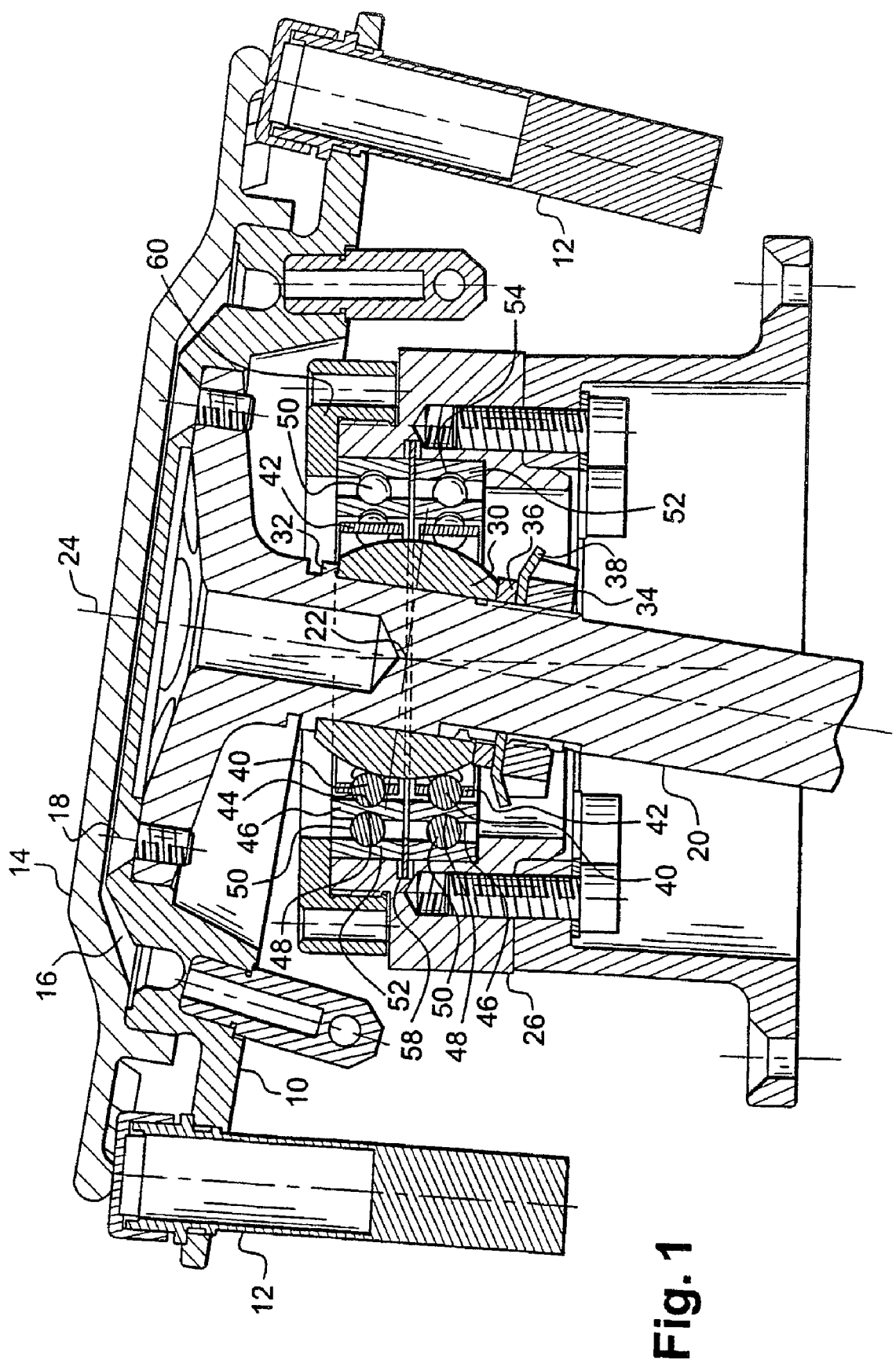
FIG. 1 is a partial schematic view in axial section of a rapid vibration apparatus for tubes comprising a device according to the invention.

The apparatus shown in FIG. 1 comprises essentially a plate 10 supporting on its periphery tubes 12 designed to contain biological samples so that they can be ground by means of small glass or ceramic beads, the plate 10 being fitted with a cover 14 to hold the tubes 12, this cover 14 being pressed onto the plate 10 by a vacuum in a chamber 16 delimited between the central portions of the plate 10 and of the cover 14, as described in detail in the aforementioned document WO 2004/012851.

The plate 10 is attached by screws 18 to a top end of a shaft 20 whose bottom end (not shown) is connected to drive means of the type described in document WO 2004/012851, these means comprising an eccentric bearing which receives the bottom end of the shaft 20 and which is mounted on a disk rotated by the output shaft of an electric motor, the disk being mounted on this output shaft via an elastic suspension.

In a known manner, these means make it possible to drive the shaft 20 in an oscillating movement about a center of rotation 22 that is situated on the axis 24 of the shaft 20, at the intersection of this axis and the axis of the disk supporting the eccentric bearing receiving the bottom end of the shaft 20.

The means for guiding the shaft 20 in an oscillating movement about the center of rotation 22 are supported by a ring 26 which is itself mounted on a fixed support by elastic suspension means not shown and which will be described with reference to FIG. 2.

The means for guiding the shaft 20 comprise a ball-and-socket bearing mounted on the shaft 20 and two superposed ball bearings mounted around the ball-and-socket bearing, between the latter and the ring 26.

The ball-and-socket bearing comprises a ball-and-socket joint 30 that is force-fitted onto the upper portion of the shaft 20 and that is kept pressing on a shoulder 32 of this shaft by a nut 34 screwed onto the shaft and pressing on one end of the ball-and-socket joint via a pressure washer 36 and a lock washer 38. The lock washer 38 is prevented from rotating about the axis 24 of the shaft 20 by a tab, of its inner cylindrical surface, engaged in a longitudinal groove of the cylindrical surface of the shaft 20 as represented in the drawing.

The radial outer surface of the ball-and-socket joint 30 is convex and forms a segment of a sphere having an angle at the center of approximately 90 degrees, on which two rings of balls 40 are pressed symmetrically on either side of the center of rotation 22, the balls of each ring being retained by a cylindrical cage 42 which comprises orifices in which the balls 40 are engaged, the latter also being retained and guided in a raceway formed by a semicylindrical annular slot or groove 44 of the inner surface of a cylindrical race 46 which surrounds the corresponding ring of balls 40. The cages 42 are retained axially and radially, in the position shown, by the balls 40 engaged in the orifices of the cages 42 and in the grooves 44.

The races 46 that form the outer races of the ball-and-socket bearing also form the inner races of the two ball bearings that are mounted around this ball-and-socket bearing and they each comprise for this purpose, in their outer cylindrical surface, a semicylindrical groove 48 in which the balls 50 of the corresponding ball bearing are engaged, the latter comprising an outer race 52 whose inner cylindrical surface is formed with a semicylindrical groove 54 to guide and retain the balls 50.

The outer races 52 of the ball bearings are sleeve-fitted inside the ring 26 and are fixedly attached in rotation to the latter.

The two superposed ball bearings are separated axially by a small distance determined by a thin shim 58 made of elastically deformable material such as rubber or an elastomer for example, which is interposed between the outer races 52 of the two ball bearings.

The outer race 52 of the bottom ball bearing presses on a shoulder of the inner surface of the ring 26 and a nut 60 is screwed onto the upper portion of the ring 26 and presses on the outer race 52 of the top ball bearing, the screwing of the nut 60 making it possible to adjust the axial distance between the two antifriction bearings and therefore the operating clearance of the ball-and-socket joint.

In practice, the user begins by screwing the nut 60 to the maximum on the upper portion of the ring 26 substantially to eliminate this operating clearance by pushing the two rings of balls 40 that are pressing on the ball-and-socket joint towards one another, then slightly loosens the nut 60 to provide an operating clearance on the ball-and-socket joint 30 which lies for example between 0.05 and 0.1 millimeter and immobilizes the nut 60 in rotation relative to the ring 26 by any appropriate means, for example by plastic deformation of a thin peripheral rim of this nut.

As a variant, the two antifriction bearings are mounted in a cage comprising in the upper portion tabs that are folded down to keep the antifriction bearings in the correct position with the spacing necessary for the ball-and-socket joint to operate correctly.

Furthermore, antinoise stops made of elastomer or similar material are advantageously provided at the interfaces between the metal components to reduce noise in high-speed operation.

In operation, the shaft 20 is driven at high speed in an oscillating movement about the point 22 without being able to rotate about its own axis 24, the rotation of the plate 20 about this axis being prevented by means connecting this plate to the ring 26 or to the fixed frame of the apparatus, in a manner well known to those skilled in the art and for example as described in the aforementioned document WO 2004/012851.

The high-speed movement of the shaft 20 in an oscillating movement is translated by a high-speed rotation of the races 46 relative to the ball-and-socket joint 30 that is fixed in rotation on the shaft 20 and relative to the outer races 52 of the ball bearings that are fixed in rotation on the ring 26.

The device according to the invention makes it possible to increase the angular range of movement of the shaft 20 on either side of a mid-position, this angular range of movement being able to be 8° or more in the exemplary embodiment shown. This angular range of movement is determined, on the one hand, by the axial dimension of the ball-and-socket joint (or the dimension of the portion of a sphere along the axis of the shaft 20) and, on the other hand, by the axial distance between the two rings of balls 40. The doubling of the angular range of movement relative to the embodiment described in document WO 2004/012851 makes it possible to reduce the external diameter of the plate 10 by half while retaining the same stroke of movement of the tubes 12 in curvilinear reciprocating motion and hence the same performance of rapid vibration of the tubes 12 and of grinding the biological samples contained in these tubes.

Reducing the diameter of the plate 10 results in a reduction of its weight and a reduction of the energy necessary to drive this plate.

Furthermore, the device for guiding the shaft 20 according to the invention has numerous advantages:

A ball-and-socket joint 30 available on the market can be used and the annular grooves 44 in which the balls 40 are guided pressing on the ball-and-socket joint 30 are machined with a "normal" precision of the order of a micron in inner races of standard antifriction bearings available on the market.

The guidance device according to the invention is therefore relatively simple and of low cost. In addition, the operating clearance of the ball-and-socket joint 30 is adjustable, which makes it possible to ensure an optimum operation with a ball-and-socket joint available on the market whose precise dimension is not in principle known and without it being necessary to machine with great precision the grooves 44 for guiding the balls 40.

As indicated hereinabove, the relative placement of the ball-and-socket bearing and of the ball bearing may be inverted, the ball-and-socket bearing then being between the fixed support and a ball bearing mounted on the shaft 20.

Figure 2:
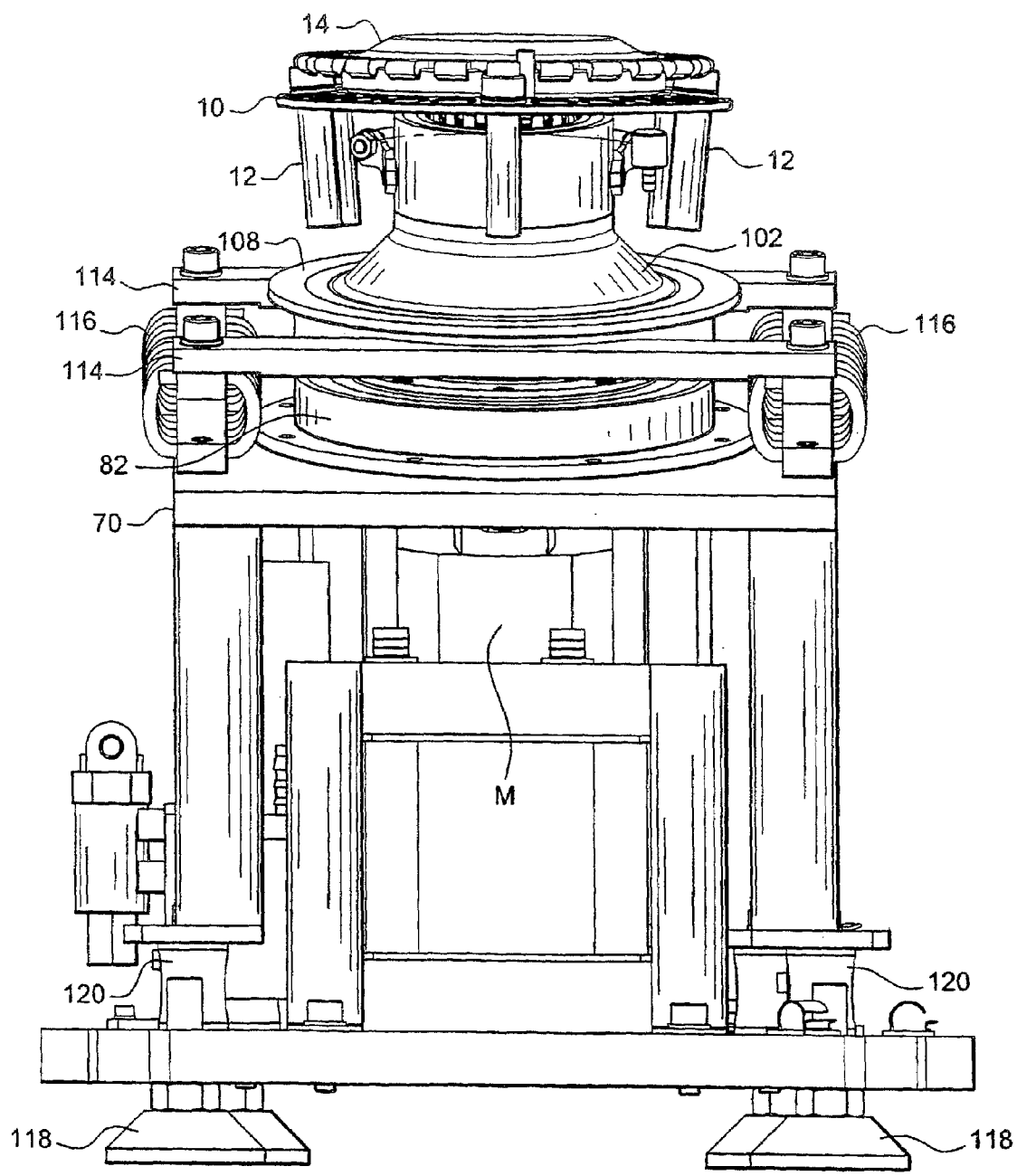
FIG. 2 is a schematic front view of a variant of this apparatus.
Figure 3:
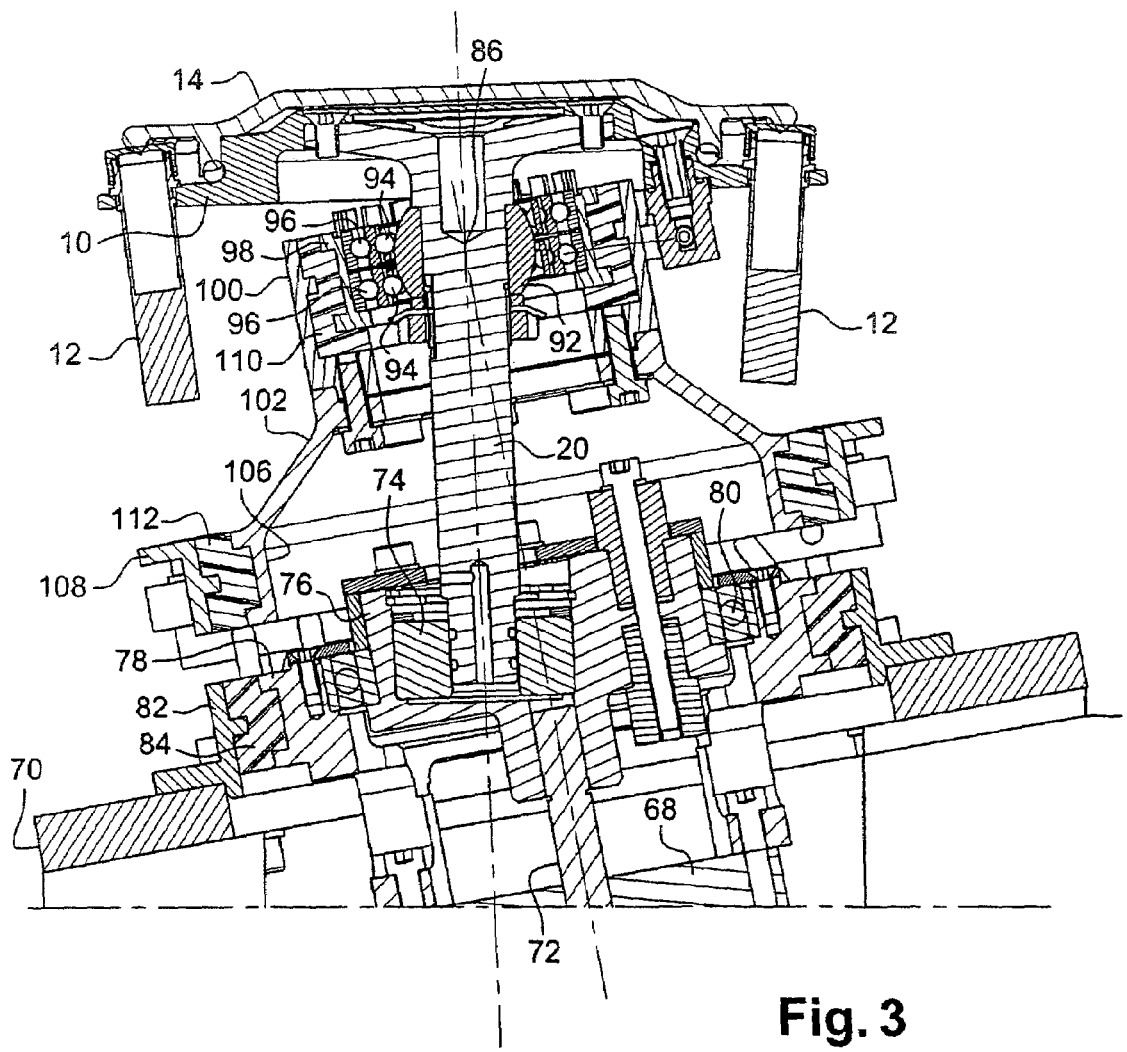
FIG. 3 is a view on a larger scale and in axial section of the upper portion of the apparatus of FIG. 2.

The apparatus shown in FIGS. 2 and 3 is also an apparatus for the rapid vibration of tubes 12 designed to contain biological samples and glass or ceramic beads, the tubes 12 being supported by a plate 10 fitted with a cover 14 and fixedly mounted at the top end of a shaft 20 which extends axially relative to the plate 10 and the cover 14.

The shaft 20 is driven by an electric motor M situated beneath the plate 10 and supported by a fixed frame 70.

The bottom end of the shaft 20 is connected to the output shaft 72 of the motor M via an eccentric 76 comprising an antifriction bearing 74 mounted at the end of the shaft 20 and housed in a cylindrical cavity of the eccentric itself mounted and guided in a cylindrical cavity of a plate 78 by means of an antifriction bearing 80. The plate 78 is mounted in a metal ring 82 attached to the fixed frame 70 via an elastomer ring 84 that is interposed between the outer periphery of the plate 78 and the metal ring 82 and that is immobilized in axial translation and in rotation on the metal ring 82 and on the plate 78.

Advantageously, the elastomer ring 84 is cast and vulcanized in situ or else is bonded onto the plate 78 and onto the metal ring 82. In addition, as shown, an annular rib may be formed protruding on the inner surface of the metal ring 82 and engaged in a matching groove of the elastomer ring 84 which itself comprises, on its inner surface, a protruding annular portion engaged in a matching groove of the outer periphery of the plate 78, to increase resistance to axial wrenching.

The cylindrical housing for mounting the antifriction bearing 74 in the disk 76 is eccentric and oriented obliquely relative to the axis of the output shaft 72 of the motor M and the axes of the shafts 20 and 72 intersect one another at a point 86 which is a center of rotation of the plate 10 and the shaft 20.

The means for centering and guiding the shaft 20 are situated at this center of rotation 86 and include a ball-and-socket and ball bearing whose ball-and-socket joint 92 is fixedly attached to the shaft 20 and interacts with two rings of balls 94 supported by cylindrical cages and mounted between the ball-and-socket joint 92 and two axially superposed outer cylindrical races which also form the inner races of two ball bearings 96 axially superposed and separated by a slight distance.

The two ball bearings 96 are mounted in an outer metal race 98 itself mounted in a top cylindrical sleeve 100 supported by a fixed part 102 whose bottom cylindrical end 106 is attached to a metal annulus 108 that is similar to the aforementioned metal race 82 and that is axially aligned with the latter.

Elastomer rings 110 and 112 are interposed respectively between the metal race 98 supporting the antifriction bearings 96 and the sleeve 100 and between the bottom end 106 of the part 102 and the annulus 108. These elastomer rings 110 and 112 are cast and vulcanized in situ or bonded and additionally retained axially by nesting on ribs of the outer parts and in grooves of the inner parts with which they interact, as already described for the elastomer ring 84 for mounting the plate 78.

The essential function of these three elastomer rings 84, 110 and 112 is to prevent the transmission of high frequency noises and vibrations between the means for guiding and driving the plate 10, on the one hand, and the fixed frame 70, on the other hand. To fully achieve this absorption of noises and vibrations, these rings are made of elastomer having a Shore A hardness lying between about 55 and 85 and preferably approximately 70.

The annulus 108 is supported (FIG. 2) by two parallel beams 114 connected at their ends to the frame 70 by elastic suspension means 116 that here are of the spiral-wound cable type and that could, as a variant, comprise elastomer blocks or stops. These elastic suspension means 116 have the function of filtering the low frequency and medium frequency vibrations that are generated on startup and shutdown of the motor M, when the speed of rotation goes from 0 to 7000 revolutions/minute approximately, and vice versa.

Thanks to this set of means, the noise level of the apparatus in operation is reduced by at least 5 to 10 dB so that the apparatus in operation no longer causes annoyance in its immediate environment.

The frame 70 of the apparatus is connected to legs 118 for resting on a support surface via damping means of the "silent block" type which damp the very low frequency vibrations likely to occur on shutdown and startup of the motor M.

The mounting of the noise-deadening rings 84, 110 and 112 and of the suspension means 116 does not affect the performance of the apparatus which can operate at high speeds of rotation lying between 6000 and 8000 revolutions/minute and whose centering and guidance means have a very long service life.

The invention claimed is:

1. A device for guiding a shaft in an oscillating movement about a center of rotation situated on the axis of the shaft, comprising a ball-and-socket bearing and a ball bearing mounted one inside the other between the shaft and a fixed support, wherein the ball-and-socket bearing comprises a ball-and-socket joint which is fixedly mounted on the shaft and which has an outer convex surface in a portion of a sphere forming the inner race of the bearing, two rings of balls are arranged between the ball-and-socket joint and two superposed outer races and are guided in semicylindrical annular slots or grooves of said races, and two substantially superposed outer ball bearings are mounted between said outer races and the fixed support.

2. The device as claimed in claim 1, wherein the balls of each ring are housed in orifices of a cylindrical cage arranged between the ball-and-socket joint and a corresponding outer race of the ball-and-socket bearing.

3. The device as claimed in claim 1, wherein the outer races of the ball-and-socket bearing are cylindrical and are formed by the inner cylindrical races of the outer ball bearings.

4. The device as claimed in claim 1, wherein the two rings of balls of the ball-and-socket bearing are placed symmetrically relative to the center of rotation of the shaft.

5. The device as claimed in claim 1, wherein the angular range of movement of the shaft about the center of rotation is approximately 8 degrees or more on either side of a mid-position.

6. The device as claimed in claim 1, wherein the two outer races of the ball-and-socket bearing are substantially adjacent and separated by a shim made of elastically deformable material.

7. The device as claimed in claim 1, further comprising means for adjusting the axial distance between the two superposed outer races.

8. The device as claimed in claim 7, wherein the adjustment means comprise a nut screwed onto the fixed support and pressing on an aforementioned outer race, while the other outer race is pressing on the fixed support.

9. The device as claimed in claim 8, further comprising means for stopping the nut rotating after the axial distance between the two outer races has been adjusted.

10. The device as claimed in claim 1, wherein the shaft supports a plate for supporting biological sample tubes at one of its ends and is connected to drive means via its other end mounted in an eccentric bearing supported by the output shaft of a motor.

11. The device as claimed in claim 10, wherein means for damping noise and vibrations are mounted between a fixed frame and the means for guiding and driving the shaft.

12. The device as claimed in claim 11, wherein the means for damping noise and vibrations comprise elastomer rings.

13. The device as claimed in claim 12, wherein the rings are made of elastomer having a Shore A hardness lying between 55 and 85.

14. The device as claimed in claim 13, wherein the rings are made of elastomer having a Shore A hardness of approximately 70.

15. The device as claimed in claim 12, wherein an eccentric connecting one end of the shaft to a drive shaft is guided in rotation in an antifriction bearing mounted in a plate that is itself mounted by means of an aforesaid elastomer ring on the fixed frame.

16. The device as claimed in claim 12, wherein the ball-and-socket bearing and the ball bearings for guiding the shaft are mounted inside a metal race itself attached to a cylindrical sleeve by an aforementioned elastomer ring.

17. The device as claimed in claim 16, wherein an elastomer ring is mounted between a fixed part supporting the sleeve and an annulus connected to the fixed frame.

18. The device as claimed in claim 12, wherein the aforementioned elastomer rings are immobilized in translation on the parts between which they are mounted.

19. The device as claimed in claim 12, wherein the elastomer rings are cast and vulcanized in situ or bonded to the parts between which they are mounted.

20. The device as claimed in claim 11, wherein the noise and vibration damping means also comprise means for elastically suspending an upper portion of the device, comprising at least the bearing and the antifriction bearings for centering and guiding the shaft on a lower portion of the device, comprising the fixed frame and means for driving the shaft.

21. The device as claimed in claim 20, wherein the elastic suspension means are of the type with elastomer stops or blocks or with cables for the absorption of the low and medium frequencies during the shutdown and startup phases of a motor for driving the shaft.

* * * * *